US012504357B2

(12) United States Patent
Funahashi

(10) Patent No.: US 12,504,357 B2
(45) Date of Patent: Dec. 23, 2025

(54) MOISTURE METER

(71) Applicant: A&D COMPANY, LIMITED, Tokyo (JP)

(72) Inventor: Kazuma Funahashi, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 355 days.

(21) Appl. No.: 18/100,533

(22) Filed: Jan. 23, 2023

(65) Prior Publication Data

US 2023/0251173 A1 Aug. 10, 2023

(30) Foreign Application Priority Data

Jan. 27, 2022 (JP) ................. 2022-011145

(51) Int. Cl.
*G01N 5/04* (2006.01)
(52) U.S. Cl.
CPC ................... *G01N 5/045* (2013.01)
(58) Field of Classification Search
CPC ....................................... G01N 5/045
See application file for complete search history.

(56) References Cited

U.S. PATENT DOCUMENTS 5,455,781 A * 10/1995 Reynal ............... G01F 25/13 700/282
2012/0060593 A1* 3/2012 Steinrisser ............ G01N 5/045 73/73

FOREIGN PATENT DOCUMENTS

WO 2021106129 A1 6/2021

OTHER PUBLICATIONS

Ohaus, "Instruction Manual MB45 Moisture Analyzer", 2011, <https://dmx.ohaus.com/WorkArea/showcontent.aspx?id=3524> (Year: 2011).*
Sartorius, "Minimum sample weights according to USP <41>, OIML R 76 and EURAMET cg-18", Aug. 2020, <https://www.sartorius.com/resource/blob/580758/6e89cff42ec6efa2863140b467dc5463/minimum-weight-white-paper-en-sartorius-pdf-data.pdf> (Year: 2020).*
Mettler-Toledo, "Micro-Weighing Guide: 10 Steps to Successful Micro-Weighing", Apr. 2016, <https://pim-resources.coleparmer.com/selection-guide/1133602-1133744xpr-microweighguide.pdf> (Year: 2016).*
Fritsch, "EURAMET cg-18—state-of-the-art calibration guideline for non-automatic weighing instruments", ACTA IMEKO, vol. 8, No. 3, pp. 10-18, Sep. 2019, <https://acta.imeko.org/index.php/acta-imeko/article/view/IMEKO-ACTA-08%20%282019%29-03-03> (Year: 2019).*

* cited by examiner

*Primary Examiner* — Jonathan M Dunlap
(74) *Attorney, Agent, or Firm* — Studebaker Brackett PLLC

(57) ABSTRACT

Provided is a heat-drying moisture meter that presents reliability with respect to a measurement result. In order to solve the above problem, a moisture meter includes a mass sensor configured to measure the mass of a sample placed on a weighing dish, a heating chamber having the weighing dish placed inside, a heating unit configured to heat the heating chamber, and an arithmetic control unit configured to calculate the moisture content of the sample from a sample mass before heat-drying and a sample mass after heat-drying by controlling the heating unit. The arithmetic control unit presents the reliability of the moisture content based on the minimum indication of the mass sensor.

4 Claims, 4 Drawing Sheets

|  | W−D ≦ 5 dig | C |
|---|---|---|
| 5 dig < | W−D ≦ 20 dig | B |
| 20 dig < | W−D | A |

| A \ W | 50g | 25g | 10g | 5g | 2g | 1g | 0.5g |
|---|---|---|---|---|---|---|---|
| 2 [Environment: Good] | 0.00% | 0.01% | 0.02% | 0.04% | 0.10% | 0.20% | 0.40% |
| 3 [Environment: Intermediate] | 0.01% | 0.01% | 0.03% | 0.06% | 0.15% | 0.30% | 0.60% |
| 5 [Environment: Bad] | 0.01% | 0.02% | 0.05% | 0.10% | 0.25% | 0.50% | 1.00% |

MOISTURE METER

CROSS-REFERENCE TO RELATED APPLICATION, BENEFIT CLAIM, AND INCORPORATION BY REFERENCE

The present application claims priority under 35 U.S.C. § 119 to Japanese Patent Application No. 2022-011145 filed Jan. 27, 2022. The contents of this application are incorporated herein by reference in their entirely.

TECHNICAL FIELD

The present invention relates to a moisture meter and, more particularly, to a heat-drying moisture meter.

BACKGROUND ART

A heat-drying moisture meter is known as one of the devices that measure the moisture of a sample. The heat-drying moisture meter evaporates the moisture in a sample by heating the sample and measures the moisture content of the sample from a change (decrease) in the mass of the sample before and after heating. A moisture content MC [%] is obtained according to equation (3):

$$MC=(W-D)/W \times 100 \qquad (3)$$

wherein
W: mass of sample before drying
D: mass of sample after drying.

As a technique of checking the performance of a heat-drying moisture meter, there is known a technique using a standard substance whose ideal moisture content and moisture changing process are known in advance. For example, the moisture meter disclosed in Patent Literature 1 uses sodium tartrate dihydrate as a standard substance. This moisture meter measures the actual moisture content and the actual heating time by actually heating the standard substance and compares them with an ideal moisture content and an ideal heating time to automatically confirm whether the moisture meter correctly functions.

CITATION LIST

Patent Literature

Patent Literature 1: WO/2021/106129

SUMMARY OF INVENTION

Technical Problem

Although the heat-drying moisture meter can measure a sample whose moisture content is low, such as a resin, the following problem arises. Depending on measurement conditions, the mass difference (water content) before and after heating is small as compared with the minimum value (minimum indication) with which a mass sensor can present a weight. Accordingly, a measurement result cannot be indicated appropriately by being included within a range of errors, resulting in a failure to implement accurate measurement.

This problem will be described with reference to a case where 2 g of a sample with a moisture content of 0.05% is measured by a moisture meter with a minimum indication of 0.001 g.

In an ideal case of this measurement, the moisture content is measured as MC=0.05 [%] according to equation (3) wherein
W (sample mass before drying)=2.000 g
D (sample mass after drying)=1.999 g
W−D=2.000 g−1.999 g=0.001 g.

However, the mass sensor is inevitably influenced by the operating environment such as vibration, wind, and sensor drift due to long-term measurement, and hence an error corresponding to one minimum indication count of the mass sensor (1 dig=0.001 g) sometimes occurs. For this reason, when the difference between W and D is smaller as in the above case, the moisture content may be measured as MC=0.10 [%] according to equation (3) wherein
W (sample mass before drying)=2.000 g
D (sample mass after drying)=1.999 g−(error: 0.001 g)
W−D=2.000 g−1.998 g=0.002 g.

That is, the measurement result of the moisture content deviates by as much as 0.05% per minimum indication count (1 dig).

This problem can be solved by increasing the amount of the sample to be heated. For example, by increasing W (sample mass before drying) of the sample in the above case from 2 g to 10 g, an ideal case will result in:
W (sample mass before drying)=10.000 g
D (sample mass after drying)=9.995 g
W−D=0.005 g
MC=0.05 [%]
and a case including an error will result in:
W (sample mass before drying)=10.000 g
D (sample mass after drying)=9.995 g−(error: 0.001 g)
W−D=0.006 g
MC=0.06 [%]
In this manner, increasing the amount of the sample will suppress the influence of an error to 0.01% per minimum indication count (1 dig).

However, it is not generally known that the moisture content measurement result obtained by a heat-drying moisture meter changes in accordance with the accuracy (minimum indication) of the mass sensor. For this reason, even if a measurement was dubious, it was difficult for a user to know the reliability of the measurement result.

The present invention has been made to solve the above problem and has as its object to provide a heating and drying moisture meter that presents the reliability of a measurement result.

Solution to Problem

In order to solve the above problem, a moisture meter according to an aspect of the present invention includes a mass sensor configured to measure the mass of a sample placed on a weighing dish, a heating chamber having the weighing dish placed inside, a heating unit configured to heat the heating chamber, and an arithmetic control unit configured to calculate the moisture content of the sample from a sample mass W before heat-drying and a sample mass D after heat-drying by controlling the heating unit. The arithmetic control unit presents the reliability of the moisture content based on the minimum indication of the mass sensor.

In the above aspect, the arithmetic control unit is preferably configured to be able to access a storage unit including a reliability determination table divided stepwise with thresholds of multiples of the minimum indication into a plurality of regions and to apply a difference W−D between the sample mass before heating/drying and the sample mass after heat-drying to the regions and present that the reliability decreases as numerical values of the regions to which the difference is applied decrease.

In the above aspect, the arithmetic control unit preferably calculates a accuracy according to equation (1) by using an environmental coefficient determined in accordance with the operating environment of the moisture meter and presents the accuracy as the reliability.

In the above aspect, the arithmetic control unit preferably calculates a recommended sample amount according to equation (2) by using an environmental coefficient determined in accordance with the operating environment of the moisture meter upon receiving the input of a numerical value of required accuracy for the moisture content and presents the recommended sample amount.

Advantageous Effects of Invention

The present invention can provide a heating and drying moisture meter that presents the reliability of a measurement result.

DESCRIPTION OF EMBODIMENTS

The preferred embodiments of the present invention will be described below with reference to the accompanying drawings. Note that in this description, a moisture meter indicates a heat-drying moisture meter unless otherwise specified.

1. First Embodiment

Figure 1:
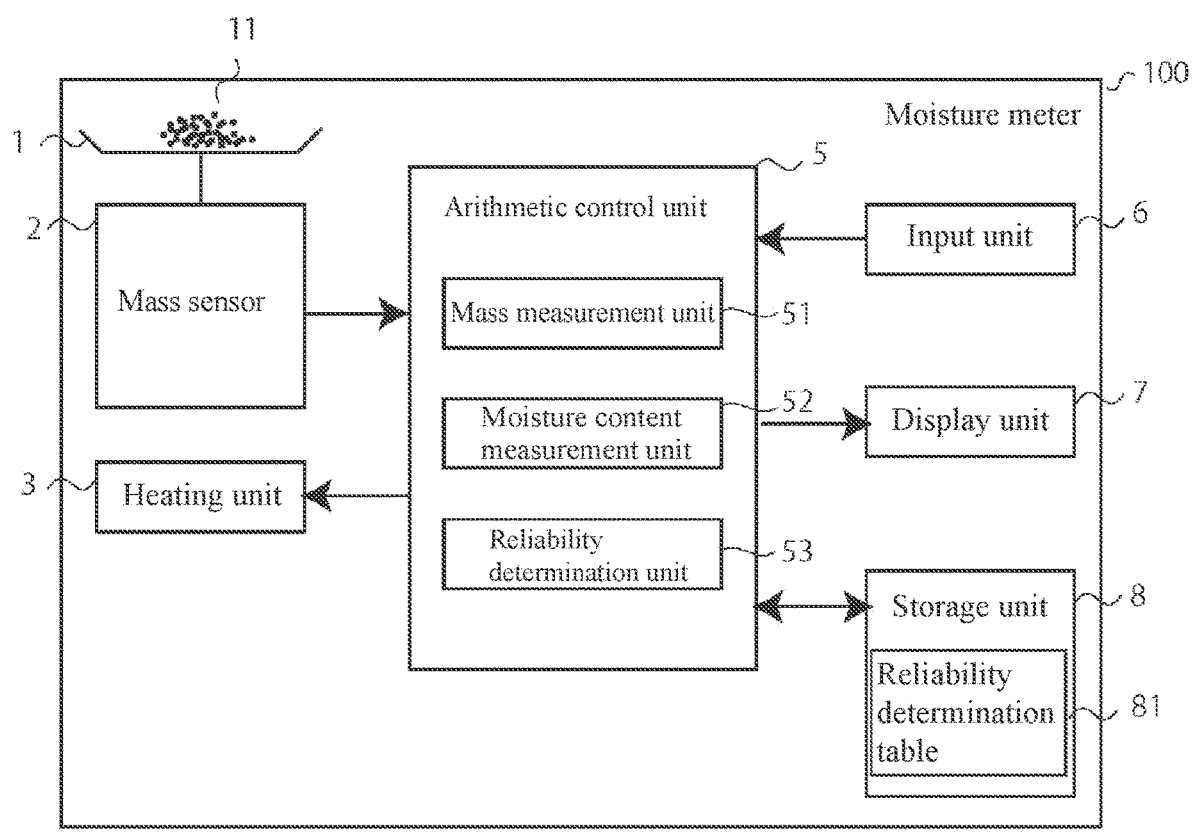
FIG. 1 is a block diagram illustrating the configuration of a moisture meter according to the first embodiment of the present invention.
Figure 2:
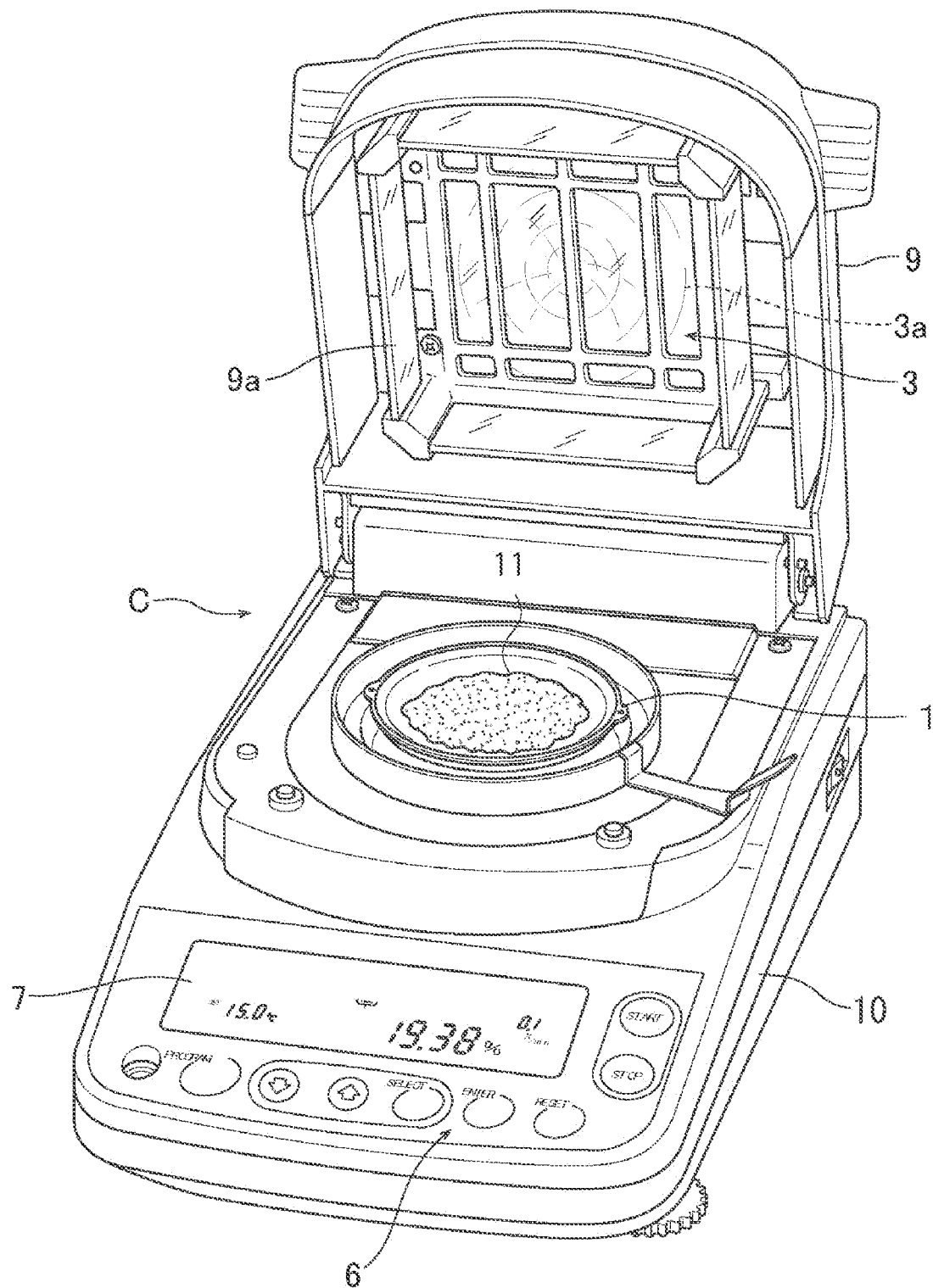
FIG. 2 is a perspective view illustrating a state in which the lid of the heating chamber is open in the same moisture meter.

FIG. 1 is a block diagram illustrating the configuration of a moisture meter 100 according to the first embodiment. FIG. 2 is a perspective view illustrating a state in which a lid 9 of a heating chamber C is open in the moisture meter 100. As illustrated in FIG. 1, the moisture meter 100 includes a weighing dish 1, a mass sensor 2, a heating unit 3, an arithmetic control unit 5, an input unit 6, a display unit 7, and a storage unit 8.

The mass sensor 2 is an electromagnetic balance type, strain gauge type, or capacitance type electromagnetic sensor. The mass sensor 2 is stored in a moisture meter body 10 (FIG. 2) and is connected to the weighing dish 1. The mass sensor 2 measures the mass of a sample 11 placed on the weighing dish 1.

The weighing dish 1 is placed in the heating chamber C that is closed by the openable lid 9 (FIG. 2). The weighing dish 1 has a handle and is configured to be detachable from the mass sensor 2. The heating chamber C is a space defined by the upper portion of the moisture meter body 10 and the lid 9 and stores the weighing dish 1.

The heating unit 3 includes a heating means 3a (FIG. 2) such as a halogen lamp or a resistance wire that generates Joule heat and a temperature sensor (not illustrated). The heating means 3a heats the heating chamber C (sample 11) under the control of the arithmetic control unit 5 based on an output from the temperature sensor. The heating means 3a is stored inside the lid 9 of the heating chamber C. The lid 9 includes a glass cover 9a (FIG. 2) in the form of a container covering the weighing dish 1 to prevent the sample 11 from coming into contact with the heating means 3a.

The input unit 6 includes a measurement start button and a measurement stop button, etc., and is used to issue instructions to start and stop measurement to the arithmetic control unit 5.

The display unit 7 is a liquid crystal display that displays measurement results, etc. Note that the input unit 6 and the display unit 7 may be configured to be integrated into a touch panel display.

The arithmetic control unit 5 is implemented by a microcomputer obtained by mounting, on an integrated circuit, a CPU (Central Processing Unit) that performs arithmetic processing and a ROM (Read Only Memory) and a RAM (Random Access Memory) as auxiliary storage units.

The arithmetic control unit 5 includes a mass measurement unit 51, a moisture content measurement unit 52, and a reliability determination unit 53. These functional units 51 to 53 each are implemented by an electronic circuit such as a CPU (Central Processing Unit), an ASIC (Application Specific Integrated Circuit), or a PLD (Programmable Logic Device) such as an FPGA (Field Programmable Gate Array).

Upon receiving a measurement start command, the mass measurement unit 51 measures the mass (W) of the sample 11 before heat-drying and then heats the heating unit 3. When the mass change of the sample 11 converges to a predetermined threshold or less, the mass measurement unit 51 ends heating and measures the mass (D) of the sample 11 after heat-drying. The storage unit 8 stores the sample mass W before drying and the sample mass D after drying.

The moisture content measurement unit 52 calculates the moisture content MC [%] of the sample 11 according to equation (3) and displays the calculated moisture content as a measurement result on the display unit 7.

The reliability determination unit 53 obtains the reliability of the moisture content MC calculated by the moisture content measurement unit 52 by using a reliability determination table 81 (to be described later) and presents the reliability to the user. This operation will be described in detail later.

The storage unit 8 is implemented by, for example, a nonvolatile semiconductor memory such as a flash memory. The storage unit 8 stores various types of programs for processing to be performed by the arithmetic control unit 5. The storage unit 8 stores the reliability determination table 81 (to be described later) by which the reliability determination unit 53 obtains reliability. However, note that the storage location of the reliability determination table 81 is not limited to the storage unit 8. The reliability determination table 81 may be stored in a storage unit in hardware such as a data logger externally mounted on the moisture meter 100 or may be stored in the management computer or management server of the moisture meter 100 so as to be acquired by the moisture meter 100 by communication.

The reliability determination table 81 is divided stepwise with thresholds (numerical values) into a plurality of regions, with one reliability being set in accordance with one region. The reliability determination table 81 is configured such that the reliabilities decrease with reductions in the values of the regions.

Thresholds for the formation of regions are preferably set based on "minimum indication" of the mass sensor 2. The minimum indication is the minimum value by which the mass sensor 2 can present a weight and is the minimum unit of numerical values displayed on the display unit 7. The minimum indication uses the unit of one digit (1 dig) and is expressed as, for example, 1 dig=0.001 g. The minimum indication of the mass sensor 2 is obtained in advance in accordance with a sensor type and stored in the storage unit 8.

An example of the configuration of the reliability determination table 81 will be described. For example, thresholds for the reliability determination table 81 are set with the unit of mass [g], [mg], or [µg]. When the minimum indication of the mass sensor 2 is 1 dig=1 mg, the table is divided into, for example, three regions as follows. In the case of 5 mg or less, the reliability is set to C (low). In the case of more than 5 mg and 20 mg or less, the reliability is set to B (intermediate). In the case of more than 20 mg, the reliability is set to A (high).

Figures 3, 4, 5:
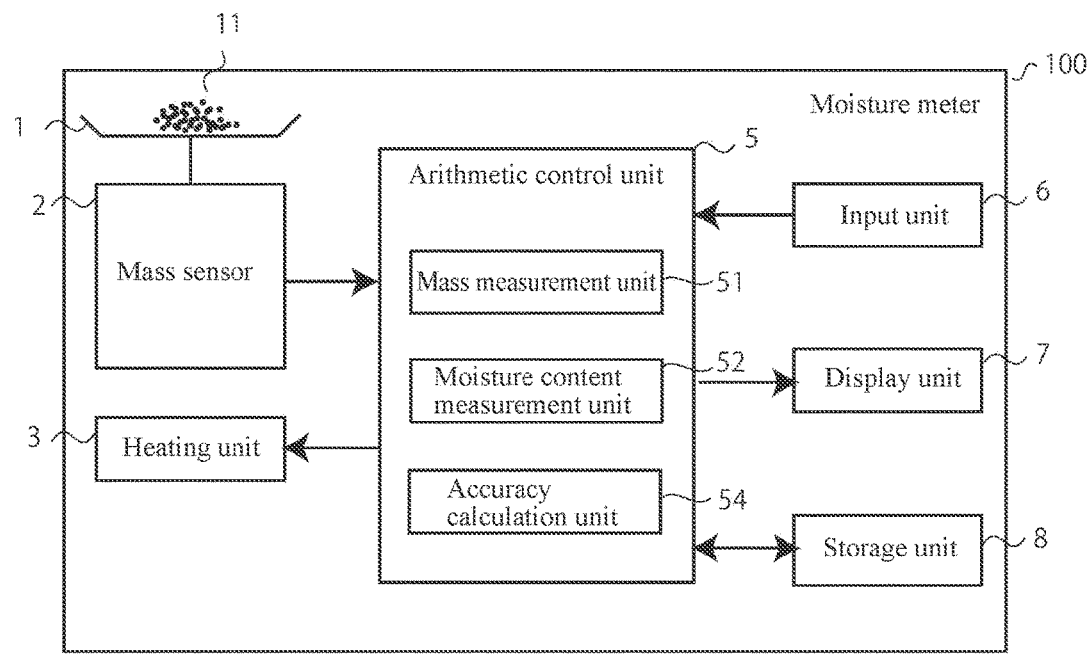
FIG. 3 is a view illustrating an example of the configuration of a reliability determination table for the same moisture meter.
FIG. 4 is a block diagram illustrating the configuration of a moisture meter according to the second embodiment of the present invention.
FIG. 5 is a view illustrating numerical examples of accuracy calculated in accordance with the environmental coefficient of the same moisture meter.

More preferably, thresholds for the reliability determination table 81 are set with the unit of [dig] based on multiples of the minimum indication of the mass sensor 2. FIG. 3 illustrates an example of the configuration of the reliability determination table 81 for the moisture meter 100 when thresholds are set with the unit of [dig]. Referring to FIG. 3, the table is divided into three regions. In the case of 5 dig or less, the reliability is set to C (low). In the case of more than 5 dig and 20 dig or less, the reliability is set to B (intermediate). In the case of more than 20 dig, the reliability is set to A (high). Assume that the reliability determination table 81 in FIG. 3 is used, and, for example, the minimum indication of the mass sensor 2 is 1 dig=0.1 mg. In the case of 0.5 mg or less, the reliability is set to C. In the case of more than 0.5 mg and 2 mg or less, the reliability is set to B. In the case of more than 2 gm, the reliability is set to A. Assume that the minimum indication of the mass sensor 2 is 1 dig=1 mg. In the case of 5 mg or less, the reliability is set to C. In the case of more than 5 mg and 20 mg or less, the reliability is set to B. In the case of more than 20 mg, the reliability is set to A. In this manner, by setting thresholds for the reliability determination table 81 with multiples of the minimum indication of the mass sensor, the evaluation criterion of reliability is configured to be changed in accordance with the accuracy of the mass sensor.

Note that the above case is an example of settings for the reliability determination table 81. The region settings are not limited to three, and the table may be divided into regions of more than three. In addition, this embodiment includes a case in which the table is divided into two regions.

The reliability determination unit 53 determines a reliability by applying the difference W−D between the sample mass W before heat-drying and the sample mass D after heat-drying to the regions of the reliability determination table 81. For example, assume that the minimum indication of the mass sensor 2 is 1 dig=0.1 mg, and the reliability determination table 81 in FIG. 3 is used. In this case, when the difference W−D is 10 mg, the reliability determination unit 53 determines that the reliability is B (intermediate) since the difference W−D=10 mg corresponds to the region of more than 5 mg and 20 mg or less. The reliability determination unit 53 displays the determined reliability as an evaluation for the measurement result, together with the moisture content MC, on the display unit 7, thereby presenting them to the user.

Note that the above has exemplified the case illustrated in FIG. 3. The reliability determination unit 53 may present reliabilities as "circle," "triangle," and "cross mark" or "good" and "poor" or messages such as "sufficiently reliable," "reliable," or "not reliable; review measurement conditions" instead of the evaluations "A," "B," and "C." The presentation of reliabilities is not limited to display on the display unit 7 and may be configured to output to a data logger, a management computer, or a management server (none of which are illustrated) connected to the moisture meter 100 via a wire or wirelessly.

As described above, the moisture meter 100 according to this embodiment can present the reliability of a measurement result (moisture content). More specifically, when the mass change of the sample 11 is small as compared with the accuracy (minimum indication) of the mass sensor 2, the moisture meter 100 determines that the reliability of the measurement result is low. This allows the user to know the reliability of the measurement result (moisture content).

2. Second Embodiment

FIG. 4 is a block diagram illustrating the configuration of a moisture meter 100 according to the second embodiment. In the second embodiment, the arithmetic control unit 5 further includes an accuracy calculation unit 54. Other than that, the same reference numerals denote the same components, and descriptions in the first embodiment are cited. An overlapping description will be omitted.

The accuracy calculation unit 54 is implemented by an electronic circuit such as a CPU, an ASIC, or a PLD such as an FPGA as in the first embodiment. The accuracy calculation unit 54 calculates the accuracy (error) of a moisture content MC by using the minimum indication of the mass sensor 2 and environmental coefficients determined in accordance with the operating environment of the moisture meter 100.

An environmental coefficient is a natural number (without application of unit) that indicates a better operating environment with a reduced number. An operating environment is regarded as good if measurement is completed in a shorter time due to the absence of vibration or wind and is regarded as bad if a longer measurement time is required due to susceptibility to vibration or wind.

More specifically, an environmental coefficient is determined, for example, as follows. The accuracy calculation unit 54 asks the user about the operating environment of the moisture meter 100 before measurement via, for example, the display unit 7 and the input unit 6. The questions include, for example, "Are you using an anti-vibration table?", "Is the measurement table located near the movement line of the user?", "Does wind blow against the moisture meter?", "Is the temperature of the air conditioner in the measurement room constant?", and "Is the measurement time equal to or more than 30 minutes?", and the user answers "YES" or "NO". The accuracy calculation unit 54 determines an environmental coefficient by scoring answers to these questions. Scoring may be implemented by incrementing by one point when an answer to a question is "yes," and the total score may be used as an environmental coefficient. Weighting may be performed in accordance with a question.

Alternatively, the accuracy calculation unit 54 may be configured to automatically determine environmental coefficients in accordance with sensor values obtained by a vibration sensor, a human sensor, and a timer provided for the moisture meter 100.

Upon determining an environmental coefficient for the moisture meter 100, the accuracy calculation unit 54 calculates the accuracy of the moisture content MC (measurement result) according to equation (1).

$$PE = \pm A \times B / W \times 100 \tag{1}$$

wherein
- PE: accuracy (unit [%])
- A: environmental coefficient
- B: minimum indication (unit shall be matched to Wr)
- W: sample mass before heating/drying (unit [g], [mg], or [μg]).

The accuracy calculation unit 54 displays the obtained accuracy PE as an error component of a measurement result, together with the moisture content MC, on the display unit 7. As in the first embodiment, the accuracy PE may be configured to be output to the data logger, the management computer, or the management server.

FIG. 5 illustrates numerical value examples of accuracies calculated in accordance with environmental coefficients. FIG. 5 indicates that an increasing accuracy [%] can be determined with a reduction in the sample mass W before heating/drying and an increase in environmental coefficient. According to the results illustrated in FIG. 5, environmental coefficients each are preferably determined so as to be set to 2, 3, or 5 since it conforms to actual conditions.

As described above, the moisture meter 100 according to this embodiment presents the accuracy (error [%]) of a measurement result (moisture content) as a reliability in consideration of the operating environment of the moisture meter 100. In this case, the moisture meter 100 can present an accuracy with higher reliability since the moisture meter 100 also considers the precision (minimum indication) of the mass sensor 2 (equation (1)). Accordingly, the user can specifically know the accuracy of a measurement result (moisture content), and he/she can roughly grasp, in accordance with the required accuracy of experiment contents, whether remeasurement should be implemented or how much the amount of the sample should be adjusted in remeasurement.

Note that the second embodiment is also preferably configured by combining with the first embodiment to present both the reliability obtained by the reliability determination unit 53 and the accuracy obtained by the accuracy calculation unit 54 with respect to the moisture content MC.

3. Third Embodiment

Figure 6:
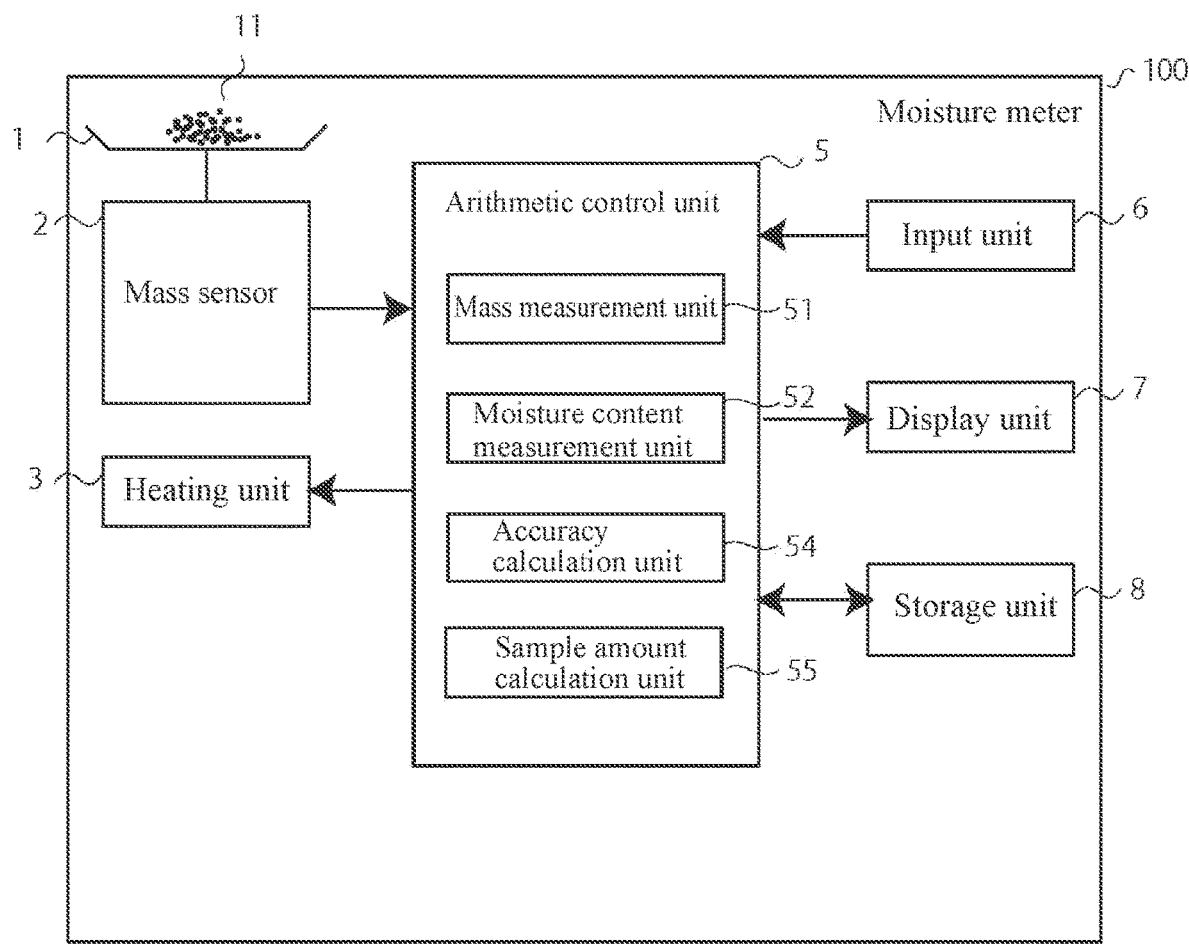
FIG. 6 is a block diagram illustrating the configuration of a moisture meter according to the third embodiment of the present invention.

FIG. 6 is a block diagram illustrating the configuration of a moisture meter 100 according to the third embodiment. In the third embodiment, the arithmetic control unit 5 further includes a sample amount calculation unit 55. The same reference numerals denote the same components, and descriptions in the first and second embodiments are cited. An overlapping description will be omitted.

Likewise, the sample amount calculation unit 55 is implemented by an electronic circuit such as a CPU, an ASIC, or a PLD such as an FPGA. Upon receiving the input of a numerical value of required accuracy for a moisture content MC from the user via the input unit 6, the sample amount calculation unit 55 calculates a sample amount (Wr) recommended for the required accuracy.

The sample amount calculation unit 55 calculates the recommended sample amount Wr according to equation (2).

$$Wr = A \times B / AC \times 100 \tag{2}$$

wherein
- Wr: recommended sample amount (unit [g], [mg], or [μg])
- A: environmental coefficient
- B: minimum indication (unit shall be matched to unit of Wr)
- AC: required accuracy (unit [%]).

An accuracy calculation unit 54 obtains the environmental coefficient A. The user inputs the required accuracy AC such as "±0.1%." The sample amount calculation unit 55 calculates the recommended sample amount Wr according to equation (2) and displays it on the display unit 7.

As described above, when the user inputs required accuracy to the moisture meter 100 according to this embodiment, the moisture meter 100 specifically presents a recommended sample amount. As a matter of course, it is difficult for the user to determine whether the amount of the sample is appropriate for a measurement result. The moisture meter 100 according to this embodiment is convenient since it can present information specifically indicating how much the amount of the sample should be increased.

Note that the third embodiment may be configured to present a sample amount together with the measurement result (moisture content) obtained by the moisture content measurement unit 52 or may be combined with the first embodiment to also present the reliability obtained by the reliability determination unit 53. In addition, the third embodiment may be combined with the second embodiment to also present the accuracy obtained by the accuracy calculation unit 54.

Although the preferred embodiments and their modifications concerning the moisture meter according to the present invention have been described, the above embodiments and modifications are merely examples of the present invention. These embodiments and modifications can be combined based on the knowledge of a person skilled in the art. Such combined embodiments are also incorporated in the scope of the present invention.

In addition, this description states a heating and drying moisture meter as a moisture meter. However, the present invention can also be applied to a moisture meter according to another embodiment including a mass sensor and configured to read a change (reduction) in the mass of a sample before and after heating and calculate the moisture content.

REFERENCE SIGNS LIST

- 100: Moisture meter
- C: Heating chamber
- 1: Weighing dish
- 2: Mass sensor
- 3: Heating unit
- 5: Arithmetic control unit
- 51: Mass measurement unit
- 52: Moisture content measurement unit
- 53: Reliability determination unit
- 54: Accuracy calculation unit
- 55: Sample amount calculation unit
- 8: Storage unit
- 81: Reliability determination table
- 11: Sample

The invention claimed is:

1. A moisture meter comprising:
a mass sensor configured to measure a mass of a sample placed on a weighing dish;
a heating chamber having the weighing dish inside;
a heating unit configured to heat the heating chamber;
an arithmetic control unit configured to calculate a moisture content of the sample from a sample mass W before heat-drying and a sample mass D after heat-drying by controlling the heating unit; and
a display,
wherein the arithmetic control unit is further configured to display on the display information indicative of a reliability of the calculated moisture content based on a minimum weight indicatable by the mass sensor and displayable by the display,
wherein the reliability information represents an influence of an error per one count of the minimum weight indicatable by the mass sensor on the moisture content, and
wherein the arithmetic control unit is configured to access a storage unit including a reliability determination table divided stepwise with a threshold of a multiple of the minimum weight indicatable by the mass sensor into a plurality of regions, apply a difference W−D between the sample mass before heat-drying and the sample mass after heat-drying to the regions, and display that the reliability decreases as numerical values of the regions to which the difference is applied decrease.

2. The moisture meter according to claim 1,
wherein the arithmetic control unit calculates an accuracy of the reliability according to equation (1) by using an environmental coefficient determined in accordance with an operating environment of the moisture meter and displays the accuracy as the reliability:

$$PE = \pm A \times B / W \times 100 \qquad (1)$$

wherein
PE: accuracy
A: environmental coefficient
B: minimum indication
W: sample mass before heating/drying.

3. The moisture meter according to claim 1,
wherein the arithmetic control unit calculates a recommended sample amount according to equation (2) by using an environmental coefficient determined in accordance with an operating environment of the moisture meter upon receiving an input of a numerical value of required accuracy for the moisture content and displays the recommended sample amount:

$$Wr = A \times B / AC \times 100 \qquad (2)$$

wherein
Wr: recommended sample amount
A: environmental coefficient
B: minimum indication
AC: required accuracy.

4. The moisture meter according to claim 2,
wherein the arithmetic control unit calculates a recommended sample amount according to equation (2) by using an environmental coefficient determined in accordance with an operating environment of the moisture meter upon receiving an input of a numerical value of required accuracy for the moisture content and displays the recommended sample amount:

$$Wr = A \times B / AC \times 100 \qquad (2)$$

wherein
Wr: recommended sample amount
A: environmental coefficient
B: minimum indication
AC: required accuracy.

* * * * *